:tates Patent [19]

Zweekly

[11] Patent Number: 4,606,678
[45] Date of Patent: Aug. 19, 1986

[54] CIRCULAR CHIP CONTROL INSERT
[75] Inventor: Raymond Zweekly, Royal Oak, Mich.
[73] Assignee: GTE Valeron Corporation, Troy, Mich.
[21] Appl. No.: 725,639
[22] Filed: Apr. 22, 1985
[51] Int. Cl.[4] .......................... B23B 27/22; B26D 1/00
[52] U.S. Cl. ...................................... 407/114; 407/116
[58] Field of Search ................. 407/7, 62, 64, 65, 113, 407/114, 115, 116

[56] References Cited
U.S. PATENT DOCUMENTS

| 2,863,209 | 12/1958 | Klopfer | 407/115 |
| 3,383,748 | 5/1968 | Galimberti et al. | 407/114 |
| 3,922,766 | 12/1975 | Malinchak | 407/113 |
| 4,215,957 | 8/1980 | Holma et al. | 407/114 |
| 4,273,480 | 6/1981 | Shirai et al. | 407/114 |
| 4,335,984 | 6/1982 | Zweekly | 407/114 |
| 4,465,412 | 8/1984 | Zweekly | 407/114 |

FOREIGN PATENT DOCUMENTS

| 3332821 | 5/1984 | Fed. Rep. of Germany | 407/115 |
| 2509641 | 1/1983 | France | 407/113 |
| 2057939 | 4/1981 | United Kingdom | 407/114 |

Primary Examiner—Francis S. Husar
Assistant Examiner—Jerry Kearns
Attorney, Agent, or Firm—Lloyd M. Forster

[57] ABSTRACT

A circular chip breaking insert having a plurality of overlapping peripheral conical depressions extending to the cutting edge including secondary conical depressions formed at the overlapping areas of the primary depressions.

12 Claims, 4 Drawing Figures

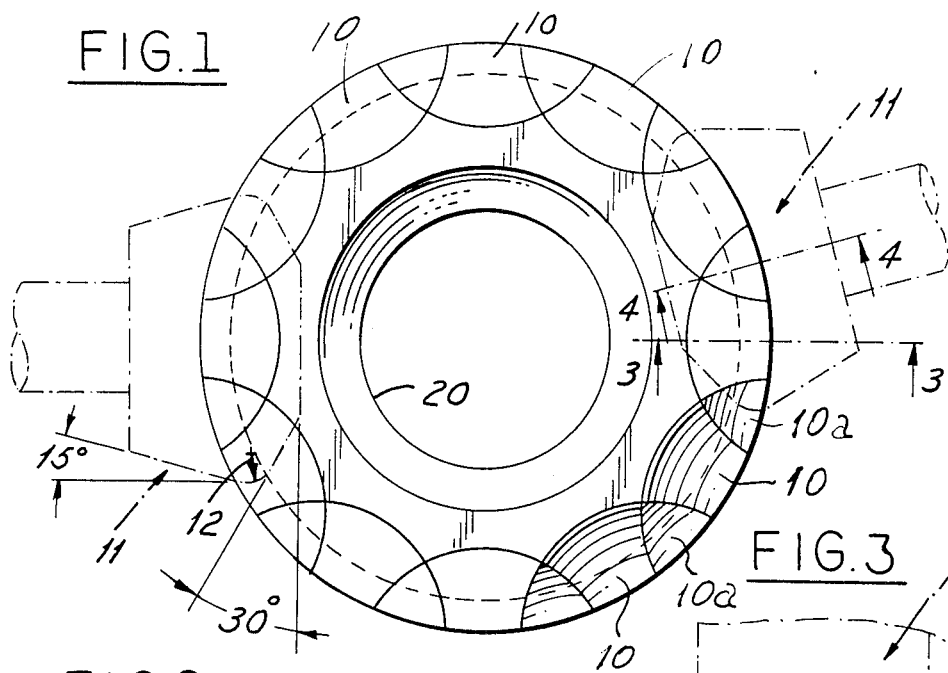
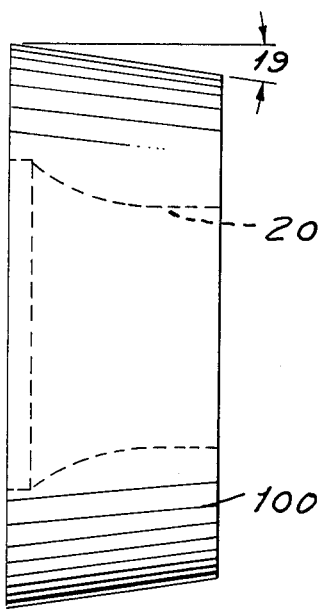
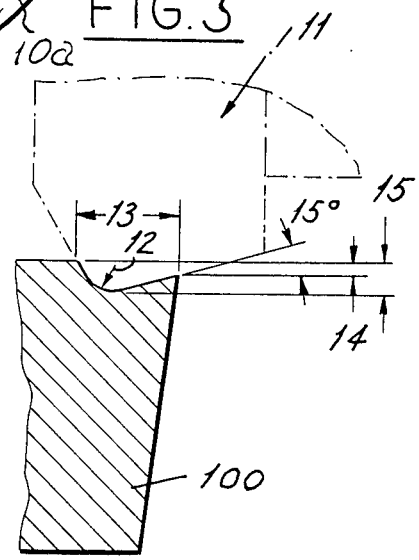
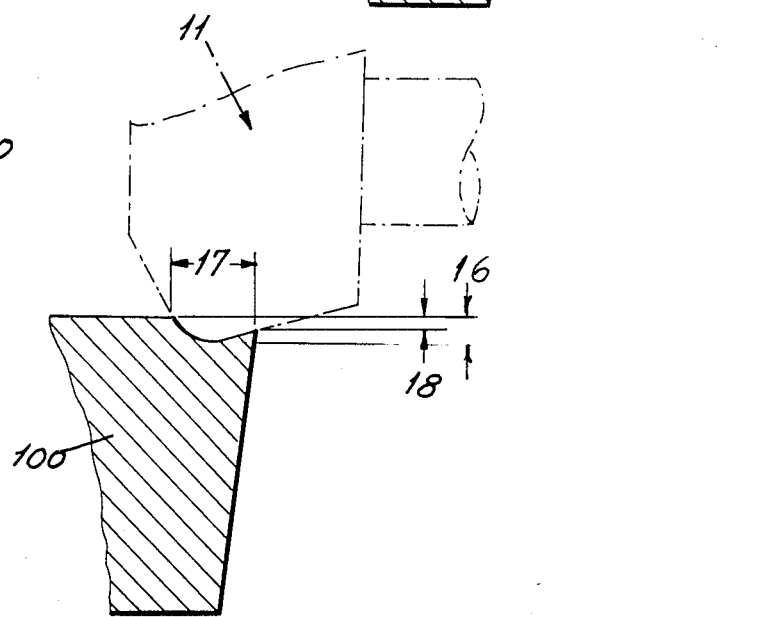

CIRCULAR CHIP CONTROL INSERT

BACKGROUND OF THE INVENTION

Circular inserts for use in lathe tools and the like have been constructed with uniform chip control grooves provided in the outer periphery of the cutting face adjacent and sometimes extending to the cutting edge.

It is also known in the art to provide a succession of chip control recesses formed on the cutting face along the cutting edge at the outer periphery which are generally spherical and may intersect or contact each other as well as the cutting edge as shown in U.S. Pat. No. 4,273,480, or may intersect the cutting edge with space between the depressions as disclosed in U.S. Pat. No. 4,215,957. The latter patent also discloses alternative depressions which are generally rectangular with inner corners spaced from the cutting edge being rounded. Depressions such as disclosed in the latter patent are alos believed to have been disclosed around the periphery of circular inserts for use in lathe tools in a manner similar to the present invention.

BRIEF DESCRIPTION OF THE PRESENT INVENTION

Applicant has produced superior chip breaking control in circular inserts through the use of overlapping depressions in the cutting face intersecting the cutting edge which are formed as arcuate segments of pairs of opposed base conical frustums haing a common laterally extending cone axis intersecting the cutter axis. The depressions are preferably spaced at 30° intervals and extend in a vertical direction to a depth providing approximately two-thirds overlap of the cutting edge perimeter. At each overlapping area a secondary conical depression form is provided with the axis of the cone bisecting the overlapping area in plan view. The compound chip control depressions resulting from such conical configurations has been found to curl and break chips more efficiently due to the intersecting compound surfaces providing unusually effective performance from shallow depth cuts in the order of 0.010" to one half the diameter of insert with inserts ranging from ⅜" to ¾" typical diameters.

With such intermediate secondary conically formed depressions, accurate indexing the position of the cutter is not critical; nor is depth of cut as compared with circular cutters having uniform chip control grooves where chips tend to curl without breaking except at limited critical depths of cut. The depressions are formed by pressing in sinter carbide inserts with individual insert grinding limited to the bottom surface and a 7° positive side angle extending to the cutting edge.

BRIEF DESCRIPTION OF THE DRAWINGS

FIG. 1 is a plan view of a preferred embodiment of the present invention;

FIG. 2 is a side elevation;

FIG. 3 is a sectional view taken along the line 3—3 of FIG. 1;

FIG. 4 is a sectional view taken along the line 4—4 of FIG. 1.

DETAILED DESCRIPTION OF THE PREFERRED EMBODIMENT

With reference to FIG. 1, twelve primary overlapping scallops 10 are formed at 30° intervals in a master, from which the pressing die is made, by vertical plunge grinding with grinding wheel 11 having at least a 20° conical slope relative to the axis connected to a 30° slope from the perpendicular (105° included angle) joined by a radius as shown at 12. For a ⅜" to ½" diameter insert the grinding wheel may be approximately ¼" outer circumference diameter.

The resulting cross section of the scalloped depression is shown in FIG. 3 formed with the axis of the grinding wheel parallel to the face of the cutter and the intersection of the two conical frustum surfaces of the grinding wheel located relative to the center of the cutter to provide a dimension 13 of 0.066", a dimension 14 of 0.010", and a depth of depression 15 of 0.020" in a ½" diameter insert, and corresponding dimensions of 0.054", 0.010" and 0.017" in a ⅜" diameter insert.

With reference to FIG. 4, the same grinding wheel positioned at an angle of 15° relative to the angle at which primary depressions are ground, as shown in FIG. 1, is plunge ground vertically to a 0.015" depth as shown at 16 providing a dimension at 17 of 0.053" and a dimension at 18 of 0.008" in a ½" diameter insert, and corresponding dimensions of 0.012", 0.041" and 0.0075 in a ⅜" diameter insert to provide twelve secondary scallops 10a.

With reference to FIG. 2 the side angle 19 of 7° is illustrated together with a cener hole 20 for securing the insert to a lathe tool.

Insert body 100 is preferably press formed of sintered tungsten carbide or equivalent requiring no machining other than grinding the bottom and 7° side surfaces.

The overlapping scallops 10 are illustrated schematically in approximate outline form without attempting to show accurate ridge line resulting from overlap and secondary plunge grinding at primary overlap areas, which in actuality produce complex geometric ridge curves contributing to the highly effective chip breaking control. The detailed dimensions are not necessarily critical but represent effectively tested, proportions as a useful guide for one skilled in the art to practice the invention.

I claim:

1. A circular chip breaking insert with a cutting face having a circular cutting edge characterized by a plurality of chip breaking depressions around the cutting face periphery intersecting each other and the cutting edge, each depression comprising segments of a pair of opposed base conical frustums connected by an arcuate juncture of their intersecting sides.

2. The insert of claim 1 wherein said conical frustums have a common axis.

3. The insert of claim 2 wherein said axis extends normal to the axial center line of said insert.

4. The insert of claim 3 wherein said depressions overlap approximately one-third of each adjacent depression at the peripheral cutting edge.

5. The insert of claim 4 wherein said conical frustum surface intersecting the cutting edge extends at approximately 15° positive rake angle relative to the cutting face in a bisecting plane including the insert axis.

6. The insert of claim 5 wherein said other conical frustum surface extends at approximately 105° included angle to the first.

7. The insert of claim 6 wherein the axially longitudinal position of conical frustum base juncture and depth of depression provide a cutting edge at the circumferential center of each depression which extends approximately one-half the depth of depression below said cutting face.

8. The insert of claim 7 wherein a cutter of approximately ½" circular diameter each of said depressions extends radially in the order of 0.66" and to a maximum depth in the order of 0.20" and said arcuate surface has a radius of approximately ⅛".

9. The insert of claim 7 wherein a cutter of approximately ⅜" circular diameter, each of said depressions extends radially in the order of 0.54" and to a maximum depth in the order of 0.17" and said arcuate surface has a radius of approximately ⅛".

10. The insert of any one of claims 1-9 including a secondary depression of generally the same configuration as the first but of lesser depth superimposed centrally on the overlapping portion of each pair of adjacent first depressions.

11. The insert of claim 1 wherein the side wall comprises a conical frustum providing a positive rake angle in the order of 7°.

12. The insert of claim 1 wherein said insert is constructed of sintered powdered metal having the pattern of depressions pressed into the cutting face.

* * * * *